US012602236B2

(12) United States Patent
Pyle

(10) Patent No.: US 12,602,236 B2
(45) Date of Patent: Apr. 14, 2026

(54) DEVICE CUSTOMIZATION WHILE REMAINING IN AN INTEGRAL OUTER PACKAGE USING NFC OR RFID TO UPDATE OR UPGRADE FIRMWARE PRIOR TO INITIAL POWER-UP

(71) Applicant: Schneider Electric USA, Inc., Andover, MA (US)

(72) Inventor: Michael William Pyle, Hermitage, TN (US)

(73) Assignee: Schneider Electric USA, Inc., Boston, MA (US)

( * ) Notice: Subject to any disclaimer, the term of this patent is extended or adjusted under 35 U.S.C. 154(b) by 0 days.

(21) Appl. No.: 18/109,401

(22) Filed: Feb. 14, 2023

(65) Prior Publication Data

US 2024/0220277 A1    Jul. 4, 2024

Related U.S. Application Data

(60) Provisional application No. 63/435,955, filed on Dec. 29, 2022.

(51) Int. Cl.
*G06F 9/445* (2018.01)

(52) U.S. Cl.
CPC ...... *G06F 9/44505* (2013.01); *G06F 9/44526* (2013.01)

(58) Field of Classification Search
CPC .................................................. G06F 9/44505
See application file for complete search history.

(56) References Cited

U.S. PATENT DOCUMENTS

| | | | | |
|---|---|---|---|---|
| 8,789,036 B2 * | 7/2014 | Maini | ................. | G06F 9/44505 717/172 |
| 8,892,086 B2 * | 11/2014 | Parry | ...................... | H04M 3/00 455/418 |
| 9,124,655 B2 * | 9/2015 | Terwilliger | ............. | G06F 9/455 |
| 9,471,330 B2 * | 10/2016 | Pinder | ................... | G06F 21/575 |
| 9,733,924 B2 * | 8/2017 | Brech | ................. | G06F 11/1433 |

(Continued)

OTHER PUBLICATIONS

International Search Report and Written Opinion for PCT Patent Application No. PCT/US2023/086253, dated Apr. 26, 2024.

*Primary Examiner* — Tammara R Peyton
(74) *Attorney, Agent, or Firm* — Quinn IP Law

(57) ABSTRACT

A method is provided, including prior to initial power-up of a device, receiving via a wireless electronic communication channel, at the device, customization assignment data identifying customization module(s) of a plurality of customization modules stored on the device that each include programmed instructions configured to cause the device to have a different device customization. Prior to initial power-up of the device, the customization assignment data is recorded by the device. After and/or in response to an initial power-up of the device, the identified customization module(s) are selected by firmware of the device from the plurality of customization modules using the customization assignment data. The device's firmware is effectively programmed and/or configured by causing a processor of the device that executes the firmware to use the selected customization module(s) to cause the device to be customized with a particular device customization of the different device customizations per the customization assignment data.

31 Claims, 4 Drawing Sheets

(56) References Cited

U.S. PATENT DOCUMENTS

| | | | |
|---|---|---|---|
| 9,838,250 B1 | 12/2017 | Ali | |
| 9,910,659 B2 | 3/2018 | Krishnamurthy et al. | |
| 10,114,656 B2 * | 10/2018 | Wu | G06F 9/4418 |
| 10,884,729 B2 * | 1/2021 | Naibero | G16H 40/63 |
| 10,970,058 B2 * | 4/2021 | Pereira Silveira | G06F 9/4406 |
| 11,625,347 B2 * | 4/2023 | Labyre | G06F 9/4403 |
| | | | 710/313 |
| 11,729,602 B2 * | 8/2023 | Qiao | H04W 12/06 |
| | | | 370/329 |
| 11,886,856 B2 * | 1/2024 | Karlgaard | G06Q 10/08 |
| 2008/0256363 A1 | 10/2008 | Balacheff et al. | |
| 2011/0143661 A1 | 6/2011 | Hartwig et al. | |
| 2014/0213233 A1 | 7/2014 | Parry et al. | |
| 2014/0215029 A1 | 7/2014 | Terwilliger et al. | |
| 2016/0292669 A1 | 10/2016 | Tunnell et al. | |
| 2017/0286084 A1 * | 10/2017 | Debates | G06K 7/10366 |

* cited by examiner

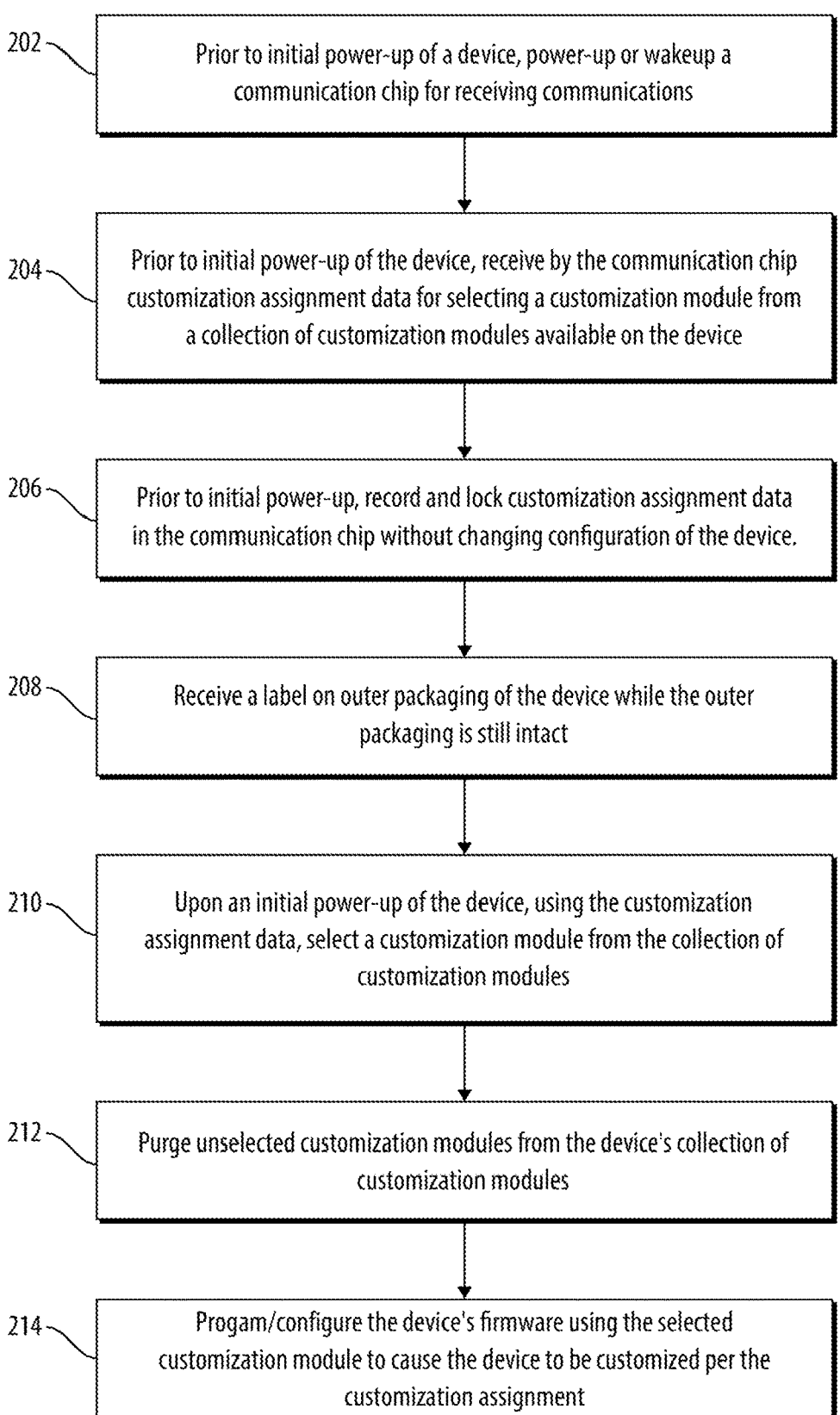

202 — Prior to initial power-up of a device, power-up or wakeup a communication chip for receiving communications 204 — Prior to initial power-up of the device, receive by the communication chip customization assignment data for selecting a customization module from a collection of customization modules available on the device 206 — Prior to initial power-up, record and lock customization assignment data in the communication chip without changing configuration of the device.

208 — Receive a label on outer packaging of the device while the outer packaging is still intact 210 — Upon an initial power-up of the device, using the customization assignment data, select a customization module from the collection of customization modules 212 — Purge unselected customization modules from the device's collection of customization modules 214 — Progam/configure the device's firmware using the selected customization module to cause the device to be customized per the customization assignment

*Fig. 2*

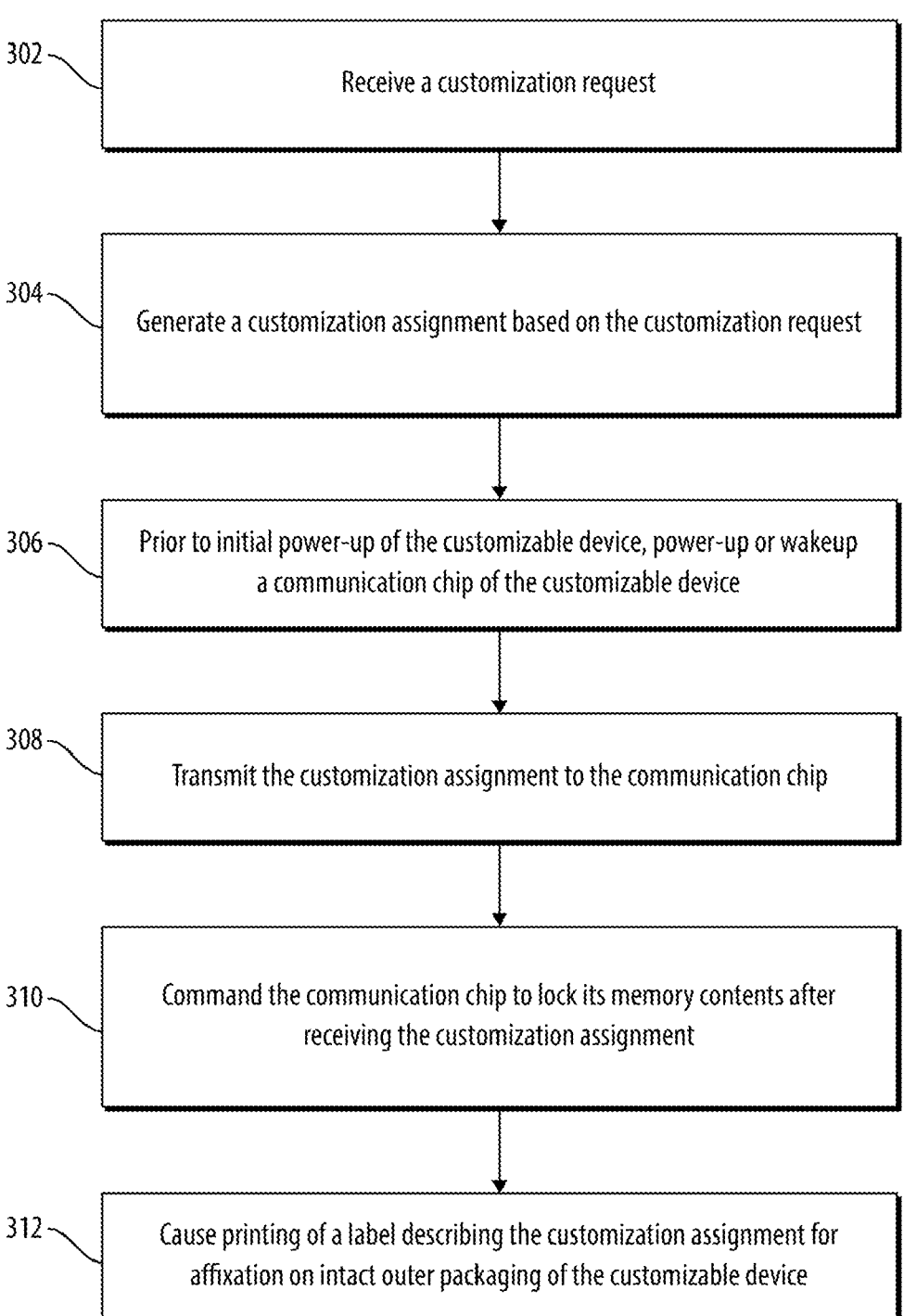

302 — Receive a customization request

304 — Generate a customization assignment based on the customization request

306 — Prior to initial power-up of the customizable device, power-up or wakeup a communication chip of the customizable device 308 — Transmit the customization assignment to the communication chip 310 — Command the communication chip to lock its memory contents after receiving the customization assignment 312 — Cause printing of a label describing the customization assignment for affixation on intact outer packaging of the customizable device

*Fig. 3*

DEVICE CUSTOMIZATION WHILE REMAINING IN AN INTEGRAL OUTER PACKAGE USING NFC OR RFID TO UPDATE OR UPGRADE FIRMWARE PRIOR TO INITIAL POWER-UP

CROSS REFERENCE TO RELATED APPLICATION

This application claims priority to U.S. Provisional Patent application Ser. No. 63/435,955, filed Dec. 29, 2022, which is incorporated herein by reference in its entirety.

TECHNICAL FIELD

The present disclosure relates to device customization, and more particularly, to techniques for customizing an electronic device while remaining in an integral outer package.

BACKGROUND

Manufacturers may manufacture a hardware base that is used for a family of products. The family of products can be customized with different functionality, features, and/or restrictions that can be selected per user or for a group of users (e.g., per region, per industry, etc.). The customization can be applied in the manufacturing process (e.g., in a final distribution center), e.g., as a last step. A process for customization can include unboxing the product, mounting the unboxed product on a workstation, applying the actual customization, and re-boxing the product. This customization process is time-consuming. In addition, when customization is performed in advance, such as before receiving an actual order for the customized product, supply issues can result. For example, certain variants of a product can be overstocked resulting in wasteful surplus, and other variants of the product can be understocked resulting in backorders. Such inventory management issues can arise even though the base hardware is identical for both variants.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method performed by a customizable device. The method includes, prior to initial power-up of the device, receiving via a wireless electronic communication channel, at the device, customization assignment data identifying at least one customization module of a plurality of customization modules stored on the device. The respective plurality of customization modules each including programmed instructions configured to cause the device to have a different device customization. Prior to initial power-up of the device, customization assignment data is recorded by the device. After and/or in response to an initial power-up of the device. The identified at least one customization module is selected, by firmware of the device, from the plurality of customization modules using the customization assignment data. The device's firmware is effectively programmed and/or configured by causing a processor of the device that executes the firmware to use the selected at least one customization module during operation of the device to cause the device to be customized with a particular device customization of the different device customizations per the customization assignment data.

In accordance with one or more embodiments, the plurality of customization modules can each have a type of at least two different types, the at least two different types including model, cryptographic algorithm, add-on functions, and configuration, wherein customization modules of the plurality of customization modules that have the type model can each correspond to a different model for causing the device to be customized as the corresponding model, customization modules of the plurality of customization modules that have the type cryptographic algorithm can each correspond to a different cryptographic algorithm for causing the device to be customized using the corresponding cryptographic algorithm, customization modules of the plurality of customization modules that have the type add-on function can each correspond to different at least one add-on function for causing the device to be customized to have the corresponding at least one add-on function, and customization of the plurality of customization modules that have the type configuration can each correspond to a different configuration for causing the device to be customized as with the corresponding configuration.

In accordance with one or more embodiments, the method can further include automatically deleting by the firmware all unselected customization modules having the same type as the at least one selected customization module.

In accordance with one or more embodiments, the method can further include automatically deleting by the firmware at least a portion of unselected customization modules.

In accordance with one or more embodiments, the method can further include before the initial power-up, locking an area of memory in which the customization assignment data is recorded.

In accordance with one or more embodiments, recording the customization assignment data by the device can use power that is used for communicating via the wireless communication channel.

In accordance with one or more embodiments, the method can further include being woken up or powered-up in order to receive and record the customization assignment data.

In accordance with one or more embodiments, the method can further include receiving on an outer packaging of the device a label that indicates the customization assignment data and that was caused to be printed in association with the receiving the customization assignment data, wherein the device and its outer packaging can be configured for the outer packaging to remain intact until the initial power-up.

In accordance with one or more embodiments, the customization assignment data can correspond to a customization request submitted by a user or external processing device.

In accordance with one or more embodiments, the method can further include utilizing one or more abstraction layers that permits a common interface to main code and only permits interfaces to the selected at least one customization module, wherein the main code can be code configured to be used by the device regardless of the device customization.

In accordance with one or more embodiments, the wireless electronic communication channel can use a near-field communication (NFC) channel and/or RFID.

In accordance with one or more embodiments, the customizable device can be one customizable device of a batch of multiple customizable devices that are customized per the customization assignment.

In accordance with one or more embodiments, the method can further include receiving via the wireless electronic communication channel, prior to the initial power-up, an encrypted hash of the customization assignment data. The method can further include, prior to the initial power-up, recording the encrypted hash. The method can further include reading, after and/or in response to the initial power-up, the recorded encrypted hash and the recorded customization assignment data. The method can further include decrypting the read recorded encrypted hash to obtain a decrypted hash, calculating a hash of the recorded customization assignment data to obtain a calculated hash, and verifying the recorded customization data based on whether the decrypted hash matches the calculated hash, wherein the customization assignment data can be only used to select the identified at least one customization module if the decrypted hash is successfully verified.

In accordance with another aspect of the disclosure, a method of customizing a device is provided. The method includes, prior to initial power-up of a device, transmitting, via a wireless communication channel, customization assignment data identifying at least one customization module of a plurality of customization modules stored on the device for causing the device to be customized with a particular device customization of a plurality of available device customizations. The respective plurality of customization modules each include programmed instructions to customize the device with a different device customization. After and/or in response to an initial power-up, firmware of the device selects the identified at least one customization module from the plurality of customization modules using the customization assignment data and effectively programs and/or configures the device's firmware by causing a processor of the device to use the selected at least one customization module during operation of the device to cause the device to be customized with the particular device customization per the customization assignment data.

In accordance with one or more embodiments, the method can further include receiving a customization request from a user or external processing device, and extracting data from the customization request to generate the customization assignment data.

In accordance with one or more embodiments, the device can record the customization assignment data prior to initial power-up of the device. The method can further include transmitting, prior to the initial power-up of the device, a lock command to lock storage of the recorded customization assignment data.

In accordance with one or more embodiments, the method can further include verifying the assignment data stored by the device before transmitting the lock command.

In accordance with one or more embodiments, the at least one customization module identified by the customization assignment data can have a type selectable from at least two different types, the at least two different types including model, cryptographic algorithm, add-on functions, and configuration, wherein customization modules of the plurality of customization modules that have the type model can each correspond to a different model for causing the device to be customized as the corresponding model, customization modules of the plurality of customization modules that have the type cryptographic algorithm can each correspond to a different cryptographic algorithm for causing the device to be customized using the corresponding cryptographic algorithm, customization modules of the plurality of customization modules that have the type add-on function can each correspond to different at least one add-on function for causing the device to be customized to have the corresponding at least one add-on function, and customization modules of the plurality of customization modules that have the type configuration can each correspond to a different configuration for causing the device to be customized as with the corresponding configuration.

In accordance with one or more embodiments, the method can further include providing power via a magnetic field for coupling to the device for enabling communication via the wireless electronic communication channel.

In accordance with one or more embodiments, upon the initial power-up of the device, at least a portion of unselected customization modules of the plurality of customization modules can be automatically deleted by the firmware.

In accordance with one or more embodiments, the method can further include causing, in association with transmitting the customization assignment data, printing of a label that indicates the customization assignment data, wherein the label can be configured to be received on an outer packaging of the device and the device and its outer packaging can be configured for the outer packaging to receive the label and remain intact until the initial power-up.

In accordance with one or more embodiments, the wireless electronic communication channel can use a near-field communication (NFC) channel and/or RFID.

In accordance with one or more embodiments, responsive to receipt of the customization request and after the assignment data is generated, the customization data can be transmitted to a plurality of devices for causing the plurality of devices to be customized with the particular device customization.

In accordance with another aspect of the disclosure, a customizable device includes a communication chip configured to, prior to initial power-up of the customizable device, receive via a wireless electronic communication channel, customization assignment data identifying at least one customization module of a plurality of customization modules stored on the customizable device. The respective plurality of customization modules each including programmed instructions configured to customize the customizable device to have a different device customization. The communication chip is father configured to, prior to initial power-up of the device, record the customization assignment data. The customizable device further includes a firmware module that includes at least one memory configured to store instructions and at least one processing device disposed at the location and in communication with the at least one memory, wherein the at least one processing device upon execution of the instructions is configured to: read the customization assignment data recorded by the communication chip, after and/or in response to an initial power-up of the device, select the identified at least one customization module from the plurality of customization modules using the customization assignment data that was read, and effectively program and/or configure the device's at least one processing device by causing the at least one processing device to use the selected at least one customization module during operation of the device to cause the device to be customized with a particular device customization of the different device customizations per the customization assignment data.

In accordance with one or more embodiments, the plurality of customization modules can each have a type of at least two different types, the at least two different types including model, cryptographic algorithm, add-on functions, and configuration, wherein customization modules of the plurality of customization modules that have the type model can each correspond to a different model for causing the device to be customized as the corresponding model, customization modules of the plurality of customization modules that have the type cryptographic algorithm can each correspond to a different cryptographic algorithm for causing the device to be customized using the corresponding cryptographic algorithm, customization modules of the plurality of customization modules that have the type add-on function can each correspond to different at least one add-on function for causing the device to be customized to have the corresponding at least one add-on function, and customization of the plurality of customization modules that have the type configuration can each correspond to a different configuration for causing the device to be customized as with the corresponding configuration.

In accordance with one or more embodiments, the at least one processing device upon execution of the instructions can be further configured to automatically delete all unselected customization modules having the same type as the at least one selected customization module.

In accordance with one or more embodiments, the at least one processing device upon execution of the instructions can be further configured to automatically deleting at least a portion of unselected customization modules.

In accordance with one or more embodiments, the at least one processing device upon execution of the instructions can be further configured to, before the initial power-up, lock an area of memory in which the customization assignment data is recorded.

In accordance with a further aspect of the disclosure, a customization system is provided. The customization system includes at least one memory configured to store instructions, and at least one processing device disposed at the location and in communication with the at least one memory, wherein the at least one processing device upon execution of the instructions is configured to, prior to initial power-up of a device, transmit, via a wireless communication channel, customization assignment data identifying at least one customization module of a plurality of customization modules stored on the device for causing the device to be customized with a particular device customization of a plurality of available device customizations. The respective plurality of customization modules each including programmed instructions to customize the device with a different device customization. After and/or in response to an initial power-up, firmware of the device selects the identified at least one customization module from the plurality of customization modules using the customization assignment data and effectively programs and/or configures the device's firmware by causing the a processor of the device that executes the firmware to use the selected at least one customization module during operation of the device to cause the device to be customized with the particular device customization per the customization assignment data.

In accordance with one or more embodiments, the at least one processing device upon execution of the instructions can be further configured to receive a customization request from a user or external processing device, and extract data from the customization request to generate the customization assignment data.

In accordance with one or more embodiments, the device can record the customization assignment data prior to initial power-up of the device, and the at least one processing device upon execution of the instructions can be further configured to transmit, prior to the initial power-up of the device, a lock command to lock storage of the recorded customization assignment data.

In accordance with one or more embodiments, upon the initial power-up of the device, at least a portion of unselected customization modules of the plurality of customization modules can be automatically deleted by the firmware.

In accordance with still further aspects of the disclosure a non-transitory computer readable storage medium and one or more computer programs embedded therein is provided for one or more of the disclosed methods. When executed by a corresponding computer system of one or more computer systems, the one or more computer programs cause the corresponding computer system to perform the corresponding disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 2 is a flowchart illustrating an example method performed by a customizable device of the customization system, in accordance with one or more embodiments of the disclosure;

FIG. 3 is a flowchart illustrating an example method performed by a customization station of the customization system, in accordance with one or more embodiments of the disclosure.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
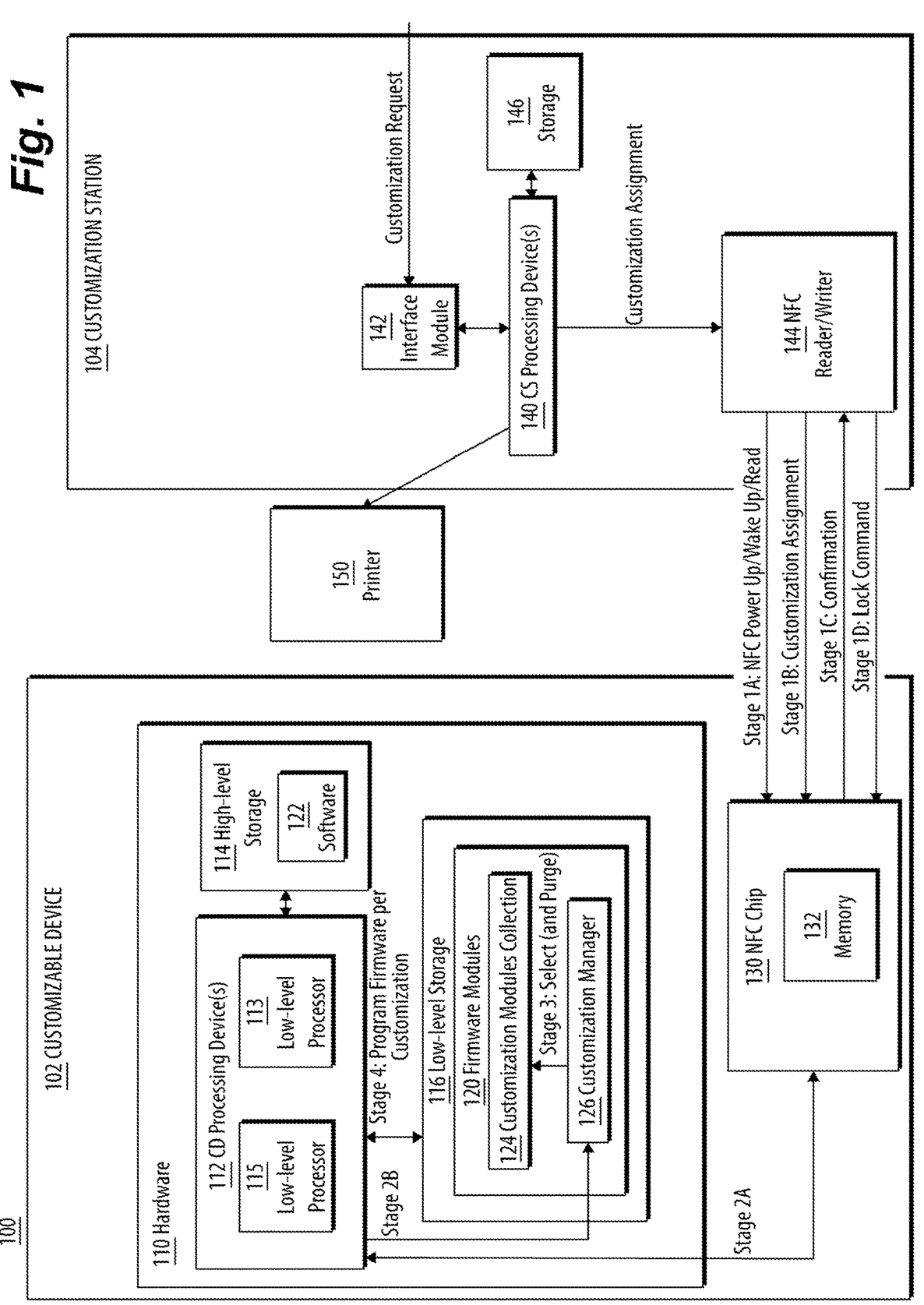
FIG. 1 is a block diagram illustrating an example customization system, in accordance with one or more embodiments of the disclosure.

With reference now to the drawings, for purposes of explanation and illustration, and not limitation, a block diagram of an exemplary embodiment of a customization system in accordance with the disclosure is shown in FIG. 1, wherein the customization system is designated generally by reference character 100. Methods associated with customized configuration of devices in accordance with the disclosure, or aspects thereof, are provided in FIGS. 2-4, as will be described.

Turning now descriptively to the drawings, in which similar reference characters denote similar elements throughout the several views, FIG. 1 is a block diagram illustrating an exemplary customization system 100. Customization system 100 includes a customization station 104 that is configured to customize firmware of one or more customizable devices 102.

The term "firmware" refers to binaries executed by an embedded processing device. The term "code" may be used in reference to firmware, software, or any program available for execution by a device.

An embedded device is generally dedicated to providing a specific task or set of tasks. It can be used in a standalone manner, such as a microwave oven, or used as a component of a larger system, such as a thermostat in a smart home. Other examples of systems having embedded devices include a programmable logic controller (PLC), network firewall, network switch, digital energy meter, digital protective relay, and other systems used in industrial control systems.

Customizable device 102 is a smart device that includes at least one processing device referred to as customizable device (CD) processing device(s) 112. For example, customizable device 102 can be a laptop computer, hand-held mobile device, an industrial device, a smart appliance, a smart sensor, a smart circuit breaker, a component configured for installation in a smart vehicle, an embedded system, a computer peripheral, etc. Customizable device 102 includes hardware 110 and a near-field communication (NFC) chip 130. Hardware 110 refers to a physical portion of the customizable device 102 that can be touched, felt, and seen. For example, hardware 110 can include computer parts, such as one or more CD processing devices 112, one or more storage devices (e.g., high-level storage 114 and low-level storage 116), physical communication buses, etc. Hardware 110 can include one or more of any of a housing, a circuit, a physical storage device, an electrical component, a bus, etc. More generally, hardware 110 refers to standard hardware that is not used exclusively for a customization operation.

NFC chip 130, which includes hardware and/or software for performing the disclosed NFC read and write functions, can be included with hardware 110 or can be incorporated into customizable device 102 specifically for use with a customization operation. During initial manufacturing of the hardware, NFC chip 130 is loaded with the serial number of the device and a device identifier (ID) that uniquely represents the family of devices to which the customizable device 102 it is assembled in belongs. The device ID can be stored in nonvolatile memory 132 of NFC chip 130. NFC chip 130 can be loaded with this information and added to customizable device 102 at any point in time in the manufacturing process.

Hardware 110 includes one or more CD processing devices 112, one or more storage devices (shown in this example as high-level storage 114 and low-level storage 116). Firmware modules 120 are stored in the at least one storage devices (shown in this example as low-level storage 116).

CD processing device(s) 112 includes one or more programmable devices. Some customizable devices 102 may include one or more high-level processors 113 that are configured for higher-level processing. The high-level processor(s) 113 can include, for example and without limitation, one or more main processing units (such as a central processing unit (CPU)), which can each have one or more core processors. Processing units in high-level processor 113 can be configured to process higher-level languages as well as low-level languages. CD processing device(s) 112 may include one or more low-level processors 115 that are configured for lower-level processing, including executing firmware of customizable device 102. The low-level processor(s) 115 can include, for example and without limitation, a microcontroller, microprocessor, programmable logic device (PLD), field-programmable gate array (FPGA), digital signal processor (DSP), etc. Low-level processor(s) 115 are configured to stand between specific parts of hardware 110 and the operating system or alternatively to provide functionality to interact with the specific parts of hardware 110 similar to a simple operating system.

High-level storage 114 includes volatile and/or non-volatile storage that can store software 122 (meaning non-firmware software having programmable instructions) and data. High-level storage is user-accessible and its contents can be changed (with proper authentication if needed). High-level processor 113 is configured to execute programmable instructions of software 122 stored by high-level storage 114 for causing high-level processors 113 to perform higher-level functions for operation of customizable device 102. Software 122 can include system software and application software. The system software can function to operate, extend or control a computer, providing an interface between users and hardware 110. Some examples of the system software include an operating system, interpreter, complier, assembler, and device driver. The application software runs on top of the operating system, and can function to meet a need of the user. Some examples of application software include a word processor, a spreadsheet, internet browser, music player, video conference platform.

Since high-level storage 114 is accessible and modifiable, software 122 can be installed and/or updated at any time per any authentication requirements. Software updates for updating software 122 can be automated or facilitated by a user. Software 122 is usually large and complex, often occupying a hundred kilobytes to a few gigabytes within high-level storage 114.

Low-level storage 116 is configured to store firmware modules 120. Low-level storage 116 can include non-volatile memory devices such as read-only memory (ROM), erasable programmable ROM (EPROM), flash memory, and the equivalent. Thus, a process for updating firmware can include physical replacement of ROM integrated circuits or a special procedure to reprogram EPROM or flash memory to be reprogrammed through a special procedure. In addition, some of the memory devices used for storing firmware modules 120 can be permanently installed and are not changeable after manufacture.

Firmware modules 120 can refer to software stored by low-level storage 116 that was installed at the time of installing low-level storage 116 in customizable device 102. Firmware modules 120 include programs having instructions, the respective programs causing a specific component of hardware 110 to perform the customizable device 102's basic functions. Each firmware module 120 typically occupies a few kilobytes within storage 116, which is much smaller than the memory space typically occupied by software 122. Firmware is executable code run by a microcontroller or microprocessor that instructs a device regarding which capabilities and functions to provide and how to operate. Firmware is most often used in an embedded device, but can also provide specific functions, such as BIOS functions on a personal computer or server. Operation of a device can be further defined by loading configuration parameters, the value of which can be evaluated by the device's firmware to determine whether or not to provide a particular capability or function, how to perform a function, which human language to default to, and even which firmware modules to use, effectively providing a high-level programming of the device.

Customizable device 102 is a device that can be customized by programming its firmware without changing any physical hardware 110. Customizing customizable device 102 can include setting it up, for example, with a particular customization setting, such as a particular configuration, model, and/or using a particular format. Examples of configurations include country, electrical properties (e.g., transformer ratios, frequency, etc.), language, etc. Examples of models can include activation of different applications (apps) for achieving different functionality of processing devices included in hardware 110. Examples of format can include add-ons that provide additional features, e.g., relative to a particular model.

Customizable device 102 is brought in proximity to customization station 104 or customization station 104 is brought in proximity of customizable device 102, meaning one of customizable device 102 and customization station 104 is portable for the customization operation. Although the customizable device 102 can be portable when being customized, it may be installed at its location of operation after customization such that it is not portable after installation.

Firmware modules 120 include a customization modules collection 124 and a customization manager 126. Customization modules collection 124 defines multiple possible customization modules for customizable device 102, each customization module in collection 124 including programmed instructions, meaning instructions that were preprogrammed.

Each customization module can have a type, such as model, cryptographic algorithm, add-on functions, and configuration. Each customization module having a model type corresponds to a different model, and its programmed instructions are configured to cause customizable device 102 to be customized as the corresponding model. Each customization module having a cryptographic-algorithm type corresponds to a different cryptographic algorithm, and its programmed instructions are configured to cause customizable device 102 to be customized to use the corresponding cryptographic algorithm. Each customization module having an add-on function type corresponds to a different set of one or more add-on functions, and its programmed instructions are configured to cause customizable device 102 to be customized to have the corresponding set of one or more add-on functions. Each customization module having a configuration type corresponds to a different configuration, and its programmed instructions are configured to cause customizable device 102 to be customized with the corresponding configuration.

Customization manager 126 includes programmed instructions executable on low-level processor 115 that enable communication with NFC chip 130 to receive a customization assignment having a customization module ID and possibly associated customization parameters. Accordingly, reference to operations performed by customization manager 126 can include execution of its programmed instructions by low-level processor 115. Customization manager 126 is further configured to interact with customization modules collection 124 to select one or more customization modules based on the received customization assignment, purge unselected customization modules having the same type as the selected customization module(s) (if purging is needed or desired), provide an instruction to low-level processor 115 to perform a customization based on the selected customization module(s), and/or optionally lock a customization and/or the state of customization modules collection 124 (e.g., so that non-selected customization modules that were not purged are not accessible or available).

Customization station 104 includes at least one processor (referred to as customization station (CS) processing device (s) 140), that is in communication with an interface module 142, storage 146, and an NFC reader/writer 144. Interface module 142 is configured to receive input data from a user input device or another processor via a user interface or a network interface. Interface module 142 is further configured to output data to an output device, such as via a display device and/or printer, and/or to another processor via a network interface. For example, interface module 142 can interface with a graphical user interface (GUI) for receiving input data and for outputting display data. In particular, a customization request can be received via interface module 142 from an external source, such as a user (e.g., via a GUI) or external processing device. Status information about customizations performed (e.g., per device, per batch of devices, or for a requested time period) can be output for display or printing.

NFC reader/writer 144 includes hardware and/or software for performing the disclosed NFC write (and optionally read) functions. In one or more embodiments, NFC reader/writer 144 is used as an NFC reader to verify customization assignments and/or to receive a confirmation signal from NFC chip 130.

Prior to customization of customizable device 102, CD processing device(s) 112 is configured to execute main code that causes customizable device 102 to be configured as a basic model of the device. After customizable device 102 receives a customization assignment, CD processing device (s) 112 is caused to execute customized code (which depends on the customization assignment) that is additional to the main code. CS processing device(s) 140 are configured to execute programmable instructions stored by storage 146 for causing CS processing device(s) 140 to perform the disclosed functions. Storage 146 includes volatile and/or non-volatile storage that can store the programmable instructions and data.

When a customization request is received at interface module 142, CS processing device(s) 140 can extract and/or interpret information from the customization request to use for performing a customization and provide the extracted and/or interpreted information to NFC reader/writer 144 as a customization assignment. An example of information extracted and included in the customization assignment can include one or more customization module IDs and/or one or more customization parameters. The customization module IDs identify customization modules stored in customization modules collection 124 of a target customizable device 102 that can customize the customizable device as a particular model, to use particular cryptographic algorithms, to default to a particular language on a human machine interface (HMI), to have additional add-on functions, and/or to have a particular configuration. The customization parameters can specify values that can be substituted for variables in the identified customization module(s)

An example of information extracted and interpreted to be included as a value in the customization assignment includes indication of a region of the world in which the target customizable device will be operated, This information can be interpreted to include the ID of 1) a customization module having the cryptographic algorithm type that includes an appropriate cryptographic algorithm for the indicated region, and/or 2) a customization module having the type configuration type that includes an appropriate configuration for the indicated region, such as default language. Another example of information extracted includes a description of requested functionality. This information can be interpreted to include the ID of 1) a customization module having the model type and/or a customization model having the add-on functions type that can provide the requested functionality.

The customization assignment can be hashed and the hash encrypted (effectively signed) by processing device 140 to allow the CD 102 to validate the authenticity and integrity of the customization assignment. The hash and customization assignment data is stored on NFC chip 130. CD 102 may only use the customization assignment data if the associated hash can be validated by customization manager 126 (e.g., when executing on low-level processor 115) when reading NFC chip 130. Customization manager 126 can validate the customization assignment data by calculating the hash of the customization parameters, decrypting the encrypted hash provided by processing device 140, and verifying that the calculated hash and decrypted hash match.

After and/or in response to the initial power-up, customization manager 126 (e.g., when executing on low-level processor 115) is configured to read the recorded encrypted hash and the recorded customization assignment data from NFC chip 130. Customization manager 126 decrypts the recorded encrypted hash and further calculates a hash of the recorded customization assignment data to obtain a calculated hash. Customization manager 126 further verifies the recorded customization assignment data based on whether the decrypted hash matches the calculated hash. The customization assignment data is only used for customizing customizable device 102 (e.g., for selecting at least one customization module identified by the customization assignment data) if the decrypted hash is successfully verified (meaning the decrypted hash matches the calculated hash).

By verifying hashing and encryption performed by processing device 140 with a private key, for which customizable device 102 has the corresponding public key (if using asymmetric encryption) or shared private key (if using symmetric encryption that customizable device 102 would store in a secure element or trusted platform module), tampering can be detected since the calculated hash of the customization parameters must match the decrypted version of the hash provided by processing device 140. Therefore even if NFC chip 130 is replaced by a fake chip, customization assignments stored in the fake chip will not be accepted by customization manager 126, since the hashes will not match (absent a leak of the private key).

The customization operation takes place in four stages, Stage 1-Stage 4. Stage 1 is performed when customizable device 102 is brought within a near field of customization station 104 such that NFC reader/writer 144 can communicate with NFC chip 130, without any power-up of customizable device 102. Stage 1 is performed before an initial power-up using NFC communication to write the customization assignment from NFC reader/writer 144 into memory 132 of NFC chip 130 and keep the customization secure such that it cannot be changed. The initial power-up refers to a first time that customizable device 102 is powered-up for booting customizable device 102 after customization parameters have been loaded into NFC chip 130. Customizable device 102 can remain within intact packaging throughout Stage 1. Stages 2-4 are performed upon power-up of customizable device 102 for actually customizing customizable device 102 in accordance with the customization assignment.

Stage 1 includes Stages 1A-1D. NFC reader/writer 144 can attempt to read the serial number and confirm the type of device being customized by reading the device ID from NFC chip 130, and write the received values to a nearby NFC chip 130, beginning with Stage 1A, which is a power-up/wake-up/read stage.

NFC chip 130 may be an active device that receives power from a dedicated power source that does not provide power to customizable device 102 (since Stage 1 is performed before customizable device 102 is powered-up) or may be a device that is powered by the electro-magnetic field generated by the NFC reader/writer device 144. In either case, NFC chip 130 can be in a sleep state or powered off before the customization process operation begins.

During Stage 1A, a power-up and/or wake-up operation may be performed to power-up or wakeup NFC chip 130 so that it can be read from and receive and store data written by NFC reader/writer 144. The power-up operation (and possibly the wake-up operation) includes emission of a magnetic field by NFC reader/writer 144 to induce power in NFC chip 130 to enable it to perform a read and/or write operation. The wake-up operation can begin with submission of an initiation signal from NFC reader/writer 144 to NFC chip 130 or emission of a magnetic field to induce power in NFC chip 130. The initiation signal can be the same or different from a read or write signal. Receipt of the initiation signal will cause NFC chip 130 to change from a sleep or power off state to a state in which NFC chip 130 is ready to perform a read and/or write operation.

Once NFC chip 130 is powered and is awake, NFC reader/writer 144 reads the serial number and device ID from NFC chip 130 to confirm that it matches the type of device being customized. Once confirmed, NFC writer continues with Stage 1B, and NFC reader/writer 144 writes the customization assignment. In one or more embodiments, security measures can be used, such as NFC reader/writer 144 further writing an associated encrypted (signed) hash to NFC chip 130. These can be decrypted and compared to a calculated hash by the customization manager 126 (e.g., when executing on low-level processor 115) for authenticating NFC customization station 100 and/or NFC reader/writer 144.

NFC chip 130 receives and stores the customization assignment and any associated encrypted (signed) hash in a memory 132 of NFC chip 130. Memory 132 is a nonvolatile memory that can be locked to prevent alteration of the stored contents. In one or more embodiments, once locked, the contents of memory 132 can never be altered. In one or more embodiments, once locked, the contents of memory 132 can be altered under particular circumstances, such as a write signal from NFC reader/writer 144 or a different secure NFC device that has been authenticated.

In one or more embodiments, NFC chip 130 sends a confirmation signal at Stage 1C to NFC reader/writer 144 upon receiving the customization assignment. In embodiments in which a confirmation signal is provided, NFC reader/writer 144 waits for the confirmation signal before proceeding to send the lock command at Stage 1D. In embodiments in which a confirmation signal is not provided, NFC reader/writer 144 can send a lock command at Stage 1D a short time after sending the customization assignment. In one or more embodiments, before sending the lock command, NFC reader/writer 144 can further read the customization assignment back from NFC chip 130 to confirm that the customization assignment data stored by NFC chip 130 and read back matches the customization assignment provided by NFC reader/writer 144 at stage 1B. At Stage 1D, the lock command is sent using NFC communication from NFC reader/writer 144 to NFC chip 130. In embodiments, a confirmation signal is not provided and Stage 1D is omitted. Rather, NFC chip 130 is configured to lock memory 132 once a customization assignment is successfully received without the need for receiving any instructions to do so. Accordingly, once the customization assignment is stored in memory 132, memory 132 is locked such that its contents cannot be altered, wherein the locking operation can be in response to receiving the confirmation signal at Stage 1C in accordance with certain embodiments or in response to receiving the customization assignment at Stage 1B in accordance with other embodiments.

In one or more embodiments, NFC chip 130 is programmed to automatically lock memory 132 once a customization assignment is received. Thus, NFC reader/writer 144 is not involved in confirmation that customization assignment was received or causing memory 132 to be locked.

Information about the customization assignment for customizable device 102 can be printed on a label by printer 150 and/or stored as status data. Information printed on the label can include, for example, a summary of the customization, including any personalization settings that were made. For example, the label can specify a serial number of the customizable device 102 and identify country (and/or cryptographic algorithms and/or configuration to be used), model, and/or any add-on function. The information on the label thus indicate feature sets customizable device 102 will support and geographic regions in which the customizable device 102 will be able to operate. In this way, there will be a record of the device serial number and how what it will be customized once it is initially powered-up.

Stage 1 can be performed as a last step before shipping customizable device 102 to a final distribution center, meaning once it is already known which customizations to use per device before shipping. This avoids the need to guess how many devices of each model to configure, which assists with inventory management, such as by avoiding overstocking or understocking for a particular model based on predictions. In addition, each customizable device 102 can remain in its packaging throughout Stage 1 up until the customizable devices 102 are shipped.

From an operator's point of view, Stage 1 of the customization process includes entering the customization request into customization station 104 via a user input or by transmitting it via a processing device. The customization request can be entered once and used for customizing multiple (e.g., one hundred) customizable devices 102 for the respective customization settings. Each customizable devices 102 that is to be customized is made to pass by and briefly paused beside NFC write 144 of customization station 104, and the process can proceed without any further intervention by the operator, other than by placing the appropriate label on the customizable device.

When a customization request specifies customization of multiple customizable devices 102 per one or more customization settings, the operator can be prompted to cause the proper number of customizable devices 102 to pass by (e.g., on a conveyor belt) and be paused near NFC reader/writer 144. This can be repeated for each batch of customizable devices 102 with common customization settings.

In one or more embodiments, a customization process can be quickly applied to a batch of customizable devices by using multiple NFC reader/writers 144. Each NFC reader/writer 144 can belong to a different customization station 104, or one customization station 104 can include multiple NFC reader/writers 144. A conveyer belt associated with each NFC reader/writer 144 can transport one or more customizable devices 102 of the batch in sequence to pass close to NFC reader/writer 144 for performance of a customization operation.

The customization request can specify how many customizable devices are in the batch that are instructed to be customized per the customization assignment. In one or more embodiments, the multiple NFC reader/writers 144 can operate in parallel to provide the same customization settings in response to a single customization request for a single customization assignment. In one or more embodiments, a different customization request, each having a single customization assignment, can be processed by each NFC reader/writer 144. In one or more embodiments, one or more customization requests having one or more customization assignments each can be delegated to the multiple NFC reader/writers 144 so that respective NFC reader/writers 144 can process a queue having one or more customization assignments, each customization assignment specified to be applied to a designated number of customizable devices 102. The label for each customization assignment can be printed and automatically applied to the package of the corresponding customizable device 102 in conjunction with performance of the customization.

NFC chip 130 is illustrated to use an NFC communication channel and associated NFC protocols for communicating with reader/writer 144. The disclosed customization system 100 can use an alternative wireless communication channel for Step 1. The alternative wireless communication channel can be used before the initial power-up of customizable device 102 and supports wireless communication between customizable device 102 and proximate customization station 104 when customizable device 102 is sufficiently proximate customization station 104. Thus, Step 1 can use a communication channel that is equivalent to an NFC communication channel and/or is developed in the future. A communication channel that requires a very close proximity, such as NFC, can be advantageous for purposes of security and accuracy. For example, an NFC communication channel can require a proximity of 3 cm between communicating devices.

Stages 2-4 of the customization process are completed by customization manager 126 (e.g., when executing on processing devices 112) after or in response to (i.e., not before) the NFC chip 130's memory 132 is locked with the stored customization assignment and after customizable device 102 undergoes its initial power-up. The initial power-up can trigger Stages 2-4 to proceed automatically.

In one or more embodiments, the customization process can proceed in stages. Customizable device 102 can be configured based on a core model (e.g., model XYZ). At initial power-up, NFC reader/writer 144 can send a customization assignment that tells NFC chip 130 a model number that identifies the model to which it should be configured (e.g., model XYY, which provides additional functionality over core model XYZ). In one or more embodiments, NFC chip 130 can save this information in memory 132, and at subsequent power-ups customization manager 126 can look up the model in memory 132 of NFC chip 130.

In one or more embodiments, NFC chip 130 can obtain the model number from NFC reader/writer 144 at subsequent power-ups in addition to or alternative to recording the model number in nonvolatile memory 132.

In one or more embodiments, after or in response to the initial power-up, CD processing device(s) 112 (or customization manager 126) can set indications (e.g., flags or the like) in customizable modules collection 124 to indicate which functionality, (e.g., of model XYY) and/or a cryptographic algorithms and/or configuration (e.g., for the U.S.) should be supported. At subsequent power-ups, subroutines are accessed that are associated with the indicated (e.g., flagged) customizable modules in customizable modules collection 124. The accessed subroutines can then provide the functionality of the assigned model and add-on functions (e.g., XYY) and support the assigned cryptographic algorithm and configuration.

In one or more embodiments, in response to or after the initial power-up, customization manager 126 determines the assigned model and corresponding modules in customizable modules collection 124 and stores this information in nonvolatile memory of high-level storage 114. At a subsequent power-up, customization modules needed for customizing customizable device 102 are already stored and can be applied by CD processing device(s) 112. In one or more embodiments, customization manager 126 and/or CD processing device(s) 112 can be reset after the initial power-up, and customization manager 126 and/or CD processing device(s) 112 can then be configured again using any of the techniques described.

As described, customization manager 126 is included in firmware modules 120 of customizable device 102 that is stored in low-level storage 116 and is executable by low-level processor 115. Customization manager 126 is configured to read and verify the customization assignment stored in memory 132, using a hash algorithm and a decryption algorithm (if the customization assignment is hashed and the hash is encrypted (signed)) to validate the authenticity and integrity of the customization assignment provided to the customizable device 102.

Upon the initial power-up, at Stage 2A, customization manager 126 is triggered to cause CD processing device(s) to retrieve the customization assignment data from memory 132 and validate its signature, which is the encryption used to encrypt the hash of the customization assignment data (if a signature is used). If the signature is not valid, the customizable device 102 will make a log entry of the failure, indicate an alert if possible, and proceed to operate with default functionality. At Stage 2B, customization manager 126 determines or is notified that the validation is successful, allowing it to proceed to Stage 3. At Stage 3, customization manager 126 automatically uses the customization module ID in the customization assignment data that was read to select a corresponding customization module from customization modules collection 124. Customization modules collection 124 is then locked to not allow access to any other customization modules stored in customization modules collection 124. Alternatively or additionally to locking customization modules collection 124, customization manager 126 can purge the remaining customization modules that do not match the customization module ID, or purge customization modules having the same type as the customization module identified by the customization module ID.

In order to provide the availability to support different modules that provide similar functionality (e.g., for different models, cryptographic algorithms, add-on functions, and/or configurations), customizable device 102 may utilize one or more abstraction layers. The abstraction layer(s) provide a common interface to the main code of customizable device 102 and only permit interfaces to the underlying customization modules for which customizable device 102 is configured.

At Stage 4, customization manager 126 performs the customization by enabling or flagging or otherwise indicating the customization modules selected at Stage 3 so that they are available for use by the CD processing device(s) 112, effectively programming and/or configuring the firmware of customizable device 102. Optionally, customization manager 126 may delete or remove any (or particular) customization modules that will not be used by customizable device 102. Programming and/or configuring the firmware can further include providing any customization parameters included with the customization assignment to use when executing the customization module. The customization parameters can be used by substituting their values for variables in the customization module.

To prevent tampering, individual customization modules that may be retained or deleted as part of the customization process can be individually signed, separately from the main code. This authenticates and verifies inclusion or deletion of the customization modules as a part of the normal boot process of customizable device 102. The customization parameters may also be verified by comparing their values to those loaded in memory 132 of NFC Chip 130.

With reference now to FIGS. 2 and 3, shown are flowcharts demonstrating example implementation of the various exemplary embodiments. It is noted that the order of blocks shown in FIGS. 2 and 3 is not required, so in principle, the various blocks may be performed out of the illustrated order or in parallel. Also certain blocks may be skipped, different blocks may be added or substituted, or selected blocks or groups of blocks may be performed in a separate application following the embodiments described herein.

FIG. 2 illustrates a flowchart that shows an example method performed by a customizable device, such as customizable device 102 shown in FIG. 1. The process can be initiated by a customization station, such as customization station 104 shown in FIG. 1. For example, customization station can receive a customization request that requests customization of a customizable device (or a plurality of customizable devices), which triggers a customization process.

At block 202, prior to initial power-up of a customizable device, a communication chip is powered-up or woken up for enabling the communication chip to receive communications from a customizable device transmitting data via a wireless communication channel. The communication chip is configured to at least read and store data via the wireless communication channel. In one or more embodiments the communication chip can write data to another customizable device as well. Communication chip can be, for example, and NFC chip such as NFC chip 130 shown in FIG. 1. In one or more embodiments, the communication chip can have a dedicated power source that provides it with power even when customizable device 102 is not powered up, in which case block 202 can be omitted. Also at block 202, a device ID can be read from communication chip's nonvolatile memory, wherein the device ID identifies a family of devices to which the customizable device belongs from its time of assembly.

At block 204, prior to initial power-up of the customizable device, the communication chip receives customization assignment data via the wireless communication channel. The customizable device does not use the customization assignment data before its initial power-up. The customization assignment data can include a customization module ID that identifies a customization module of a collection of customization modules, such as customization modules collection 124 shown in FIG. 1. The customization assignment data can further include customization parameters that have values to substitute for variables in the identified customization module. The customization module and parameters define how processors of the device will operate, namely what type of functionality the customizable device will have, how the customizable device will be configured, and/or which cryptographic algorithms will be used.

A plurality of customization modules may be disposed behind one or more abstraction layers such that a common interface may be used by the main body of the device's main code to utilize them. The collection of customization modules may only be accessible to a customization manager, such as customization manager 126 shown in FIG. 1.

In one or more embodiments, the customization modules can include programmed instructions to configure the customizable device based on at least one of a configuration, a model, a cryptographic algorithm, and functionality of the customizable device.

At block 206, prior to initial power-up of the customizable device, the customization assignment data is recorded and locked in the customizable device without changing the current configuration of the customizable device. The customization assignment data can be recorded in a memory of the communication chip or other non-volatile memory. Locking can be initiated by the communication chip or by the customization station. If available, locking the recorded data memory location can provide additional protection against tampering with the communication chip or the stored customization assignment data such that once the customization assignment data is received and locked, it cannot be changed. Accordingly, the locking can be performed immediately, either automatically by the communication chip or in response to a command from an outside source, such as the customization station. The command to lock the recorded data can follow confirmation by the communication chip that the customization assignment data was successfully received and recorded. In the case that blocks 204 and 206 are performed before initial power-up of the customizable device, power used is separate from power used by the customizable device for power up and operation of the customizable device.

At block 208, in one or more embodiments, a label can be received on outer packaging of the customizable device while the outer packaging is still intact. If a label is not used, other methods can be used for keeping track of which customization is assigned to the customizable device.

At block 210, after an initial power-up of the customizable device, firmware of the customizable device uses the customization assignment to select one or more customization modules that will be utilized by the device. This selection can occur in response to the power-up or in response to another event associated with the power-up or that occurs after the power-up.

At block 212, in one or more embodiments, unselected customization modules are purged from the customizable device's collection of customization modules. This can take place automatically and/or in conjunction with block 210, or can be performed in response to an event, such as receipt of a request. Until purged, unselected customization modules remain behind the abstraction layer, such as by being accessible only to customization manager 126. In other embodiments, the unselected customization modules are not purged but remain behind the abstraction level to be hidden from processing devices of the customizable device, such as CD processing device(s) 112 shown in FIG. 1 and/or the user. In one or more embodiments, only customization modules of a particular type are purged. The particular type can be the type of the customization module(s) identified in the customization assignment data.

At block 214, the selected customization modules are loaded or flagged or otherwise indicated for use by the customizable device during operation of the device, which causes the customizable device to operate as specified per the customization assignment data. This effectively programs and/or configures firmware of the customizable device. The configuration and loading of the customization modules can occur automatically under control of the customization manager, or can be in response to an event, such as an initialize command.

When the customization assignment data includes customization parameters, these can be evaluated and their values can be substituted for variables in the selected customization modules or available for use as needed by the low-level processors.

FIG. 3 illustrates a flowchart that shows an example method of customizing a customizable device performed by a customization station, such as customizable device 102 and customization station 104 shown in FIG. 1. At block 302, a customization request is received from a user or another processing device, such as via a GUI or a network interface, e.g., interface module 142 shown in FIG. 1.

At block 304, a customization assignment is generated based on the customization request. This can include extracting and/or interpreting data, such as customization module ID and parameters, if any, from the customization request. This can also include forming a hash of the extracted data using a hashing algorithm and encrypting (signing) the hash.

At block 306, while the customizable device has still not been powered-up for an initial power-up, an action is performed to power-up or wakeup a communication chip of the customizable device. In some scenarios the communication chip may already be powered and awake, such that block 306 is not necessary. Power-up or wake-up procedures can include one or more of providing an electromagnetic field to cause inductive coupling with the communication chip and/or sending a signal. Also at block 306, a read operation can be performed to read a device ID from communication chip's nonvolatile memory, wherein the device ID identifies a family of devices to which the customizable device belongs from its time of assembly. The device's serial number can also be read so that it is available for record-keeping and label printing tasks.

At block 308, customization assignment data that represents the customization assignment is transmitted to the communication chip using a wireless communication channel. The signed hash and/or original customization assignment data can be transmitted. The customization assignment data is used by firmware of the customizable device to select one or more customization module or functions from a plurality of customization modules or functions available on the customizable device, such as from customization modules collection 124. The customization modules each include programmed instructions executable by one or more processors of the customizable device. The customizable device's firmware is effectively programmed and/or configured by causing the processors to use the selected customization module(s) during operation of the device, which causes the device to be customized with a particular device customization selected by the customization assignment data from the collection of different device customizations.

At block 310, in one or more embodiments, a command is transmitted to the communication chip to lock its contents after receiving the customization assignment. In one or more embodiments, the lock command is only sent after verification that the customization assignment was properly received and stored. In one or more embodiments, the communication chip automatically locks the contents that it stores.

At block 312, a label is caused to be printed. The label describes the customization assignment and identifies the device bearing the label. Since the outer packaging was not breached throughout performance of blocks 302-312, the label can be affixed on intact outer packaging of the customizable device before the customizable device is initially powered up.

In a first example use case, the customization assignment data identifies a customization module that uses Chinese cryptography libraries. In this scenario, these libraries may be regulated to stand alone without the presence of other cryptography libraries. Accordingly, customization manager 126 purges all other cryptography libraries stored in customization modules collection 124.

In a second example use case, the customization assignment data identifies a customization module that supports a predefined feature set associated with a specific model in the product family that the hardware base supports. When the processing devices 112 is automatically programmed at Stage 4 by customization manager 126 with the customization module, the customizable device 102 is customized to align with the designated feature set of the specified model. A label affixed to outer packaging of the customizable device 102 indicates the configured model number.

In a third example use case, which is an advanced use case, NFC chip 130 receives customizable assignment data for a specific job for which customizable device 102 is destined, wherein the customizable assignment data specifies network configuration parameters for a particular position in a network at which user device 102 is to be installed. The configuration parameters can include, for example, IP address, subnet mask, default gateway, and DNS servers to be designated for the installation. By programming and/or configuring its firmware using the network parameters, customizable device 102 configures itself to align with the configuration settings for the designated network. A label affixed to customizable device 102's outer packaging can include information about the job and installation information for customizable device 102, such as where customizable device 102 is intended to be physically installed, its IP address, and identification of a subnet to which it must be connected. Provision of such information on the label would greatly ease efforts of a panel builder, contractor or system integrator.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
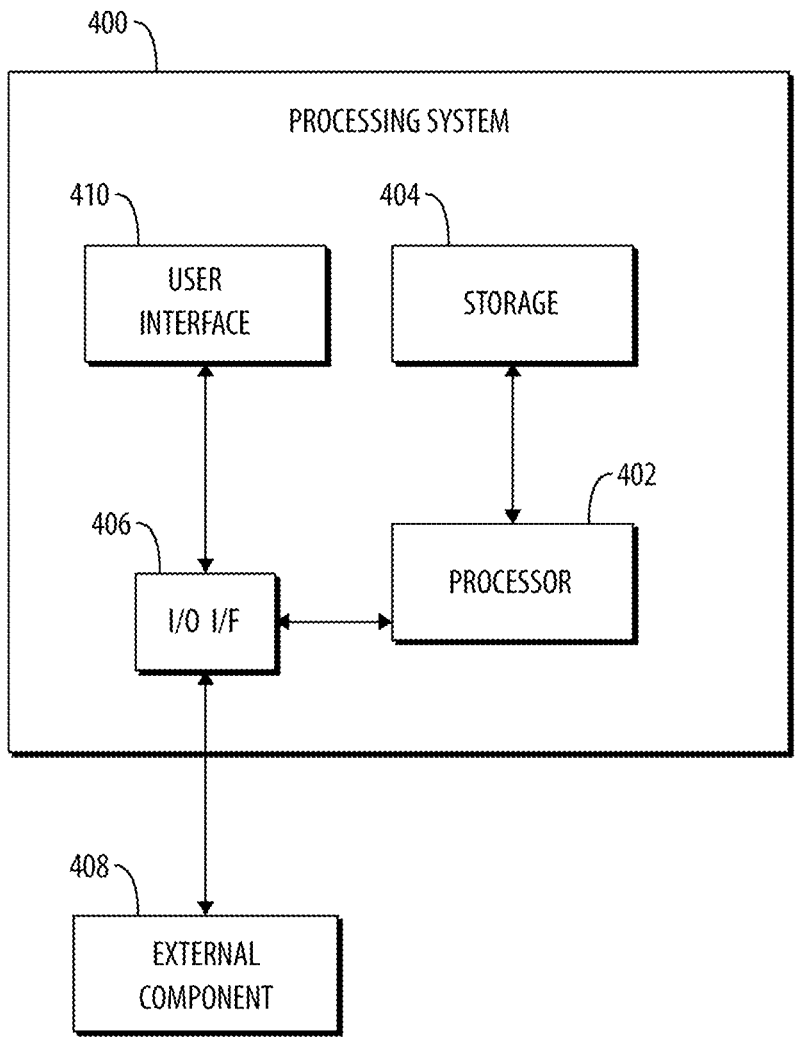
FIG. 4 is a block diagram of an example computer system used for implementation of the customizable device and the customization station shown in FIG. 1, in accordance with embodiments of the invention.

With reference to FIG. 4, a block diagram of an example computer system 400 is shown, which provides an example configuration of customizable device 102 or customization station 104, each of which can be embodied, separately or in any combination, in one or more computer systems. One such computer system 400 is illustrated in FIG. 4. In various embodiments, computer system 400 may be a server, a mainframe computer system, a workstation, a network computer, a desktop computer, a laptop, a handheld computer, an embedded system, or the like, and/or include one or more of a processor, field-programmable gate array (FPGA), application specific integrated circuit (ASIC), microcontroller, microprocessor, or the like. Computer system 400 is only one example of a suitable system and is not intended to suggest any limitation as to the scope of use or functionality of embodiments of the disclosure described herein. Computer system 400 can be implemented using hardware, software, and/or firmware. Regardless, processing system 400 is capable of being implemented and/or performing functionality as set forth in the disclosure.

Computer system 400 is shown in the form of a general-purpose computing device. Computer system 400 includes one or more processors 402, storage 404, an input/output (I/O) interface (I/F) 406 that can communicate with an internal component, such as a user interface 410, and optionally an external component 408.

Customizable device 102 or customization station 104 can be configured to handle large amounts of data. Computer system(s) used to implement customizable device 102 or customization station 104 can be implemented, for example, using multiprocessors, a big data architecture, or one or more cloud-based computer systems.

The processor(s) 402 can include, for example, a single core or multicore processor, a programmable logic device (PLD), microprocessor, DSP, a microcontroller, an FPGA, an ASIC, and/or other discrete or integrated logic circuitry having similar processing capabilities.

The processor(s) 402 and the storage 404 can be included in components provided in the FPGA, ASIC, microcontroller, or microprocessor, for example. Storage 404 can include, for example, volatile and non-volatile memory for storing data temporarily or long term, and for storing programmable instructions executable by the processor(s) 402. Storage 404 can be a removable (e.g., portable) memory for storage of program instructions. I/O I/F 406 can include an interface and/or conductors to couple to the one or more internal components and/or external components 408.

The program instructions include program modules for generally carrying out the functions and/or methodologies of embodiments of the disclosure as described herein, and can further include an operating system, one or more application programs, other program modules, and program data. Each of the operating system, one or more application programs, program modules, and program data or some combination thereof, may include an implementation of a networking environment.

Embodiments of the processing components of customizable device 102 or customization station 104 may be implemented or executed by one or more computer systems, such as a microprocessor. Each computer system 400 or multiple instances thereof can be included within customization system 100. The computer system 400 can be provided as an embedded device or include an embedded device. Portions of the computer system 400 can be provided externally, such by way of a virtual, centralized, and/or cloud-based computer.

Computer system 400 is only one example of a suitable system and is not intended to suggest any limitation as to the scope of use or functionality of embodiments of the disclosure described herein. Regardless, computer system 400 is capable of being implemented and/or performing any of the functionality set forth hereinabove.

Computer system 400 may be described in the general context of computer system-executable instructions, such as program modules, being executed by a computer system. Generally, program modules may include routines, programs, objects, components, logic, data structures, and so on that perform particular tasks or implement particular abstract data types.

Potential advantages provided by customization system 100 shown and described include the ability to customize and label individual or batches of devices immediately prior to distribution without the need to unbox the device. This can eliminate the need to stock predicted quantities of devices having particular configurations, models, and/or functionalities, avoid waste, avoid backorders, and avoid other inventory management challenges. Further potential advantages provided by, customization system 100 include provision of customizable devices 102 that are already configured and labeled for a particular job on a network, simplifying tasks of panel builders, contractors and/or system integrators to increase efficiency and to enable persons with decreased levels of skill and training to perform the tasks.

The techniques described herein are exemplary and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.).

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method, comprising:

prior to initial power-up of a device, receiving, at a communication chip added to the device and separate from hardware of the device, via a wireless electronic communication channel customization, customization assignment data identifying at least one customization module, the hardware of the device including firmware, device storage, and at least one processor that executes the firmware;

prior to initial power-up of the device, recording the customization assignment data in a memory of the communication chip, wherein the customization assignment data that was recorded remains unmoved from the memory of the communication chip prior to initial power-up of the device and is only accessible to the firmware once the device is powered up;

after and/or in response to an initial power-up of the device, accessing by the firmware the recorded customization assignment data in the memory of the communication chip and selecting by the firmware the identified at least one customization module from a plurality of customization modules using the recorded customization assignment data, the plurality of customization modules being stored in the device storage, each of the customization modules including programmed instructions configured to cause the device to have a different device customization; and effectively programming and/or configuring the firmware by causing the at least one processor to use the selected at least one customization module during operation of the device to cause the device to be customized with a particular device customization of the different device customizations per the recorded customization assignment data, wherein the access of the recorded customization assignment data caused by the firmware is sufficient as an interaction between the hardware and the recorded customization assignment data for causing the device to be customized with the particular device customization.

2. The method of claim 1, wherein the plurality of customization modules each have a type of at least two different types, the at least two different types including model, cryptographic algorithm, add-on function, and configuration, wherein:

customization modules of the plurality of customization modules that have the type model each correspond to a different model for causing the device to be customized as the corresponding model, customization modules of the plurality of customization modules that have the type cryptographic algorithm each correspond to a different cryptographic algorithm for causing the device to be customized using the corresponding cryptographic algorithm, customization modules of the plurality of customization modules that have the type add-on function each correspond to different at least one add-on function for causing the device to be customized to have the corresponding at least one add-on function, and customization of the plurality of customization modules that have the type configuration each correspond to a different configuration for causing the device to be customized as with the corresponding configuration.

3. The method of claim 2, further comprising automatically deleting by the firmware all unselected customization modules stored in the device storage having the same type as the selected at least one customization module.

4. The method of claim 1, further comprising automatically deleting by the firmware at least a portion of unselected customization modules stored in the device storage.

5. The method of claim 1, further comprising, before the initial power-up, locking an area of the memory of the communication chip in which the customization assignment data is recorded.

6. The method of claim 1, wherein recording the customization assignment data in the memory of the communication chip uses power that is used for communicating via the wireless electronic communication channel.

7. The method of claim 1, further comprising the communication chip being woken up or powered-up in order to receive and record the customization assignment data.

8. The method of claim 1, further comprising receiving on an outer packaging of the device a label that indicates the customization assignment data and that was caused to be printed in association with the receiving the customization assignment data, wherein the device is capable of receiving the customization assignment data while boxed in its outer packaging while the outer packaging is still intact, and wherein the device and its outer packaging are configured for the outer packaging to remain intact until the initial power-up.

9. The method of claim 1, wherein the recorded customization assignment data corresponds to a customization request submitted by a user or external processing device.

10. The method of claim 1, further comprising utilizing one or more abstraction layers that permits a common interface to main code stored in the device storage and only permits interfaces to the selected at least one customization module stored in the device storage, wherein the main code is code configured to be used by the device regardless of the device customization.

11. The method of claim 1, wherein the wireless electronic communication channel uses a near-field communication (NFC) channel and/or radio frequency identification (RFID).

12. The method of claim 1, wherein the device is one customizable device of a batch of multiple customizable devices that are customized per the recorded customization assignment data.

13. The method of claim 1, wherein the method further comprises:

prior to the initial power-up, receiving, by the communication chip via the wireless electronic communication channel, an encrypted hash of the recorded customization assignment data;

prior to the initial power-up, recording, by the communication chip, the encrypted hash in the memory of the communication chip;

after and/or in response to the initial power-up, reading, using the firmware, the recorded encrypted hash and the recorded customization assignment data;

decrypting, using the firmware, the recorded encrypted hash to obtain a decrypted hash;

calculating using the firmware a hash of the recorded customization assignment data to obtain a calculated hash; and verifying using the firmware the recorded customization assignment data based on whether the decrypted hash matches the calculated hash, wherein the recorded customization assignment data is only used to select the identified at least one customization module if the decrypted hash is successfully verified.

14. A method of customizing a device, comprising:

prior to initial power-up of the device, transmitting to a near frequency communication chip added to the device and separate from hardware of the device, via a wireless communication channel, customization assignment data identifying at least one customization module for recordation in a memory of the near frequency communication chip, the hardware of the device including firmware, device storage, and at least one processor that executes the firmware, wherein the customization assignment data that was recorded remains unmoved from the memory of the near frequency communication chip prior to initial power-up of the device is only accessible to firmware once the device is powered up, and wherein after and/or in response to an initial power-up, the firmware accesses the customization assignment data that is recorded in the memory of the near frequency communication chip and selects the identified at least one customization module from a plurality of customization modules stored in the device storage using the recorded customization assignment data and effectively programs and/or configures the device's firmware by causing the at least one processor to use the selected at least one customization module during operation of the device to cause the device to be customized with a particular device customization per the recorded customization assignment data, and wherein the access of the recorded customization assignment data caused by the firmware is sufficient as an interaction between the hardware and the recorded customization assignment data for causing the device to be customized with the particular device customization.

15. The method of claim 14, further comprising:

receiving a customization request from a user or external processing device; and extracting data from the customization request to generate the customization assignment data.

16. The method of claim 14, further comprising transmitting, prior to the initial power-up of the device, a lock command to lock storage of the recorded customization assignment data.

17. The method of claim 16, further comprising verifying the customization assignment data stored by the device before transmitting the lock command.

18. The method of claim 14, wherein the at least one customization module identified by the recorded customization assignment data has a type selectable from at least two different types, the at least two different types including model, cryptographic algorithm, add-on function, and configuration, wherein customization modules of the plurality of customization modules that have the type model each correspond to a different model for causing the device to be customized as the corresponding model, customization modules of the plurality of customization modules that have the type cryptographic algorithm each correspond to a different cryptographic algorithm for causing the device to be customized using the corresponding cryptographic algorithm, customization modules of the plurality of customization modules that have the type add-on function each correspond to different at least one add-on function for causing the device to be customized to have the corresponding at least one add-on function, and customization modules of the plurality of customization modules that have the type configuration each correspond to a different configuration for causing the device to be customized as with the corresponding configuration.

19. The method of claim 14, wherein upon the initial power-up of the device, at least a portion of unselected customization modules of the plurality of customization modules is automatically deleted by the firmware.

20. The method of claim 14, further comprising causing, in association with transmitting the customization assignment data, printing of a label that indicates the customization assignment data, wherein transmitting the customization assignment data is performed while the device is boxed in its outer packaging while the outer packaging is still intact, and wherein the label is configured to be received on an outer packaging of the device, wherein the device and its outer packaging are configured for the outer packaging to receive the label and remain intact until the initial power-up.

21. The method of claim 14, wherein the wireless communication channel uses a near-field communication (NFC) channel and/or radio frequency identification (RFID), and the method further comprises providing power via a magnetic field used to couple to the near frequency communication chip for enabling communication via the wireless communication channel.

22. The method of claim 15, wherein responsive to receipt of the customization request and after the customization assignment data is generated, the customization data is transmitted to a plurality of devices for causing the plurality of devices to be customized with the particular device customization.

23. A customizable device comprising:

a communication chip added to the customizable device and separate from hardware of customizable device, the hardware of the customizable device including firmware, device storage, and at least one processor that executes the firmware, the communication chip having a memory and being configured to:

prior to initial power-up of the customizable device, receive at the communication chip via a wireless electronic communication channel, customization assignment data identifying at least one customization module; and prior to initial power-up of the customizable device, record the customization assignment data in the memory of the communication chip, wherein the customization assignment data that was recorded remains unmoved from the memory of the communication chip prior to initial power-up of the customizable device and is only accessible to the firmware once the customizable device is powered up;

the firmware, upon execution by the at least one processor is configured to:

read the customization assignment data recorded in the memory of the communication chip;

after and/or in response to an initial power-up of the customizable device, select the identified at least one customization module from a plurality of customization modules using the recorded customization assignment data that was read from the memory of the communication chip, the plurality of customization modules being stored in the device storage, each of the customization modules including programmed instructions configured to cause the customizable device to have a different device customization; and effectively program and/or configure the firmware by causing the at least one processor to use the selected at least one customization module during operation of the customizable device to cause the customizable device to be customized with a particular device customization of the different device customizations per the recorded customization assignment data, wherein the access of the recorded customization assignment data caused by the firmware is sufficient as an interaction between the hardware and the recorded customization assignment data for causing the customizable device to be customized with the particular device customization.

24. The customizable device of claim 23, wherein the plurality of customization modules each have a type of at least two different types, the at least two different types including model, cryptographic algorithm, add-on function, and configuration, wherein customization modules of the plurality of customization modules that have the type model each correspond to a different model for causing the customizable device to be customized as the corresponding model, customization modules of the plurality of customization modules that have the type cryptographic algorithm each correspond to a different cryptographic algorithm for causing the customizable device to be customized using the corresponding cryptographic algorithm, customization modules of the plurality of customization modules that have the type add-on function each correspond to different at least one add-on function for causing the customizable device to be customized to have the corresponding at least one add-on function, and customization of the plurality of customization modules that have the type configuration each correspond to a different configuration for causing the customizable device to be customized as with the corresponding configuration.

25. The customizable device of claim 24, wherein the at least one processor upon execution of the firmware is further configured to automatically delete all unselected customization modules stored in the device storage having the same type as the selected at least one customization module.

26. The customizable device of claim 23, wherein the at least one processor upon execution of the firmware is further configured to automatically delete at least a portion of unselected customization modules stored in the device storage.

27. The customizable device of claim 23, wherein the at least one processor upon execution of the firmware is further configured to, before the initial power-up, lock an area of the memory in the communication chip in which the customization assignment data is recorded.

28. A customization system comprising:

at least one memory configured to store instructions; and at least one processing device disposed at an operating location of the at least one processing device and in communication with the at least one memory, wherein the at least one processing device upon execution of the instructions is configured to:

prior to initial power-up of a device, transmit to a near frequency communication chip of the device added to the device and separate from hardware of the device, via a wireless communication channel, customization assignment data identifying at least one customization module for recordation in a memory of the near frequency communication chip, the hardware of the device including firmware, device storage, and the at least one processing device that executes the firmware, wherein the customization assignment data that was recorded remains unmoved from the memory of the near frequency communication chip prior to initial power-up of the device is only accessible to firmware once the device is powered up, and wherein after and/or in response to an initial power-up, the firmware accesses the customization assignment data that is recorded in the memory of the near frequency communication chip and selects the identified at least one customization module from a plurality of customization modules stored in the device storage using the recorded customization assignment data and effectively programs and/or configures the device's firmware by causing the at least one processing device to use the selected at least one customization module during operation of the device to cause the device to be customized with a particular device customization per the recorded customization assignment data, wherein the access of the recorded customization assignment data caused by the firmware is sufficient as an interaction between the hardware and the recorded customization assignment data for causing the device to be customized with the particular device customization.

29. The customization system of claim 28, wherein the at least one processing device upon execution of the instructions is further configured to:

receive a customization request from a user or external processing device; and extract data from the customization request to generate the customization assignment data.

30. The customization system of claim 28, wherein the at least one processing device upon execution of the instructions is further configured to transmit, prior to the initial power-up of the device, a lock command to lock storage of the recorded customization assignment data.

31. The customization system of claim 28, wherein upon the initial power-up of the device, at least a portion of unselected customization modules of the plurality of customization modules is automatically deleted by the firmware.

* * * * *